US010705850B2

(12) United States Patent
Teixeira et al.

(10) Patent No.: US 10,705,850 B2
(45) Date of Patent: Jul. 7, 2020

(54) STACK FRAME UNWINDING FOR EXCEPTION HANDLING

(71) Applicant: Microsoft Technology Licensing, LLC, Redmond, WA (US)

(72) Inventors: Pedro Miguel Teixeira, Kirkland, WA (US); Neeraj K. Singh, Seattle, WA (US); Kenneth D. Johnson, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/730,713

(22) Filed: Oct. 11, 2017

(65) Prior Publication Data

US 2019/0108036 A1 Apr. 11, 2019

(51) Int. Cl.
| | | |
|---|---|---|
| G06F 9/38 | (2018.01) | |
| G06F 9/48 | (2006.01) | |
| G06F 9/46 | (2006.01) | |
| G06F 9/54 | (2006.01) | |
| G06F 9/448 | (2018.01) | |
| G06F 9/455 | (2018.01) | |
| G06F 11/07 | (2006.01) | |

(52) U.S. Cl.
CPC .......... *G06F 9/3861* (2013.01); *G06F 9/3877* (2013.01); *G06F 9/4484* (2018.02); *G06F 9/455* (2013.01); *G06F 9/461* (2013.01); *G06F 9/4806* (2013.01); *G06F 9/4812* (2013.01); *G06F 9/54* (2013.01); *G06F 11/0793* (2013.01); *G06F 2209/481* (2013.01)

(58) Field of Classification Search
None
See application file for complete search history.

(56) References Cited

U.S. PATENT DOCUMENTS

| | | | | |
|---|---|---|---|---|
| 5,628,016 A * | 5/1997 | Kukol | ...................... | G06F 8/445 717/114 |
| 6,055,649 A * | 4/2000 | Deao | ................... | G06F 11/2236 714/30 |
| 6,226,789 B1 * | 5/2001 | Tye | ........................... | G06F 8/52 717/138 |
| 6,848,111 B1 * | 1/2005 | Schwabe | ............... | G06F 9/4486 719/331 |
| 7,219,335 B1 * | 5/2007 | Moas | ................... | G06F 9/45516 714/E11.207 |

(Continued)

OTHER PUBLICATIONS

"International Search Report and Written Opinion Issued in PCT Application No. PCT/US2018/054271", dated Jan. 22, 2019, 14 Pages.

*Primary Examiner* — Eric Coleman

(57) ABSTRACT

A system for exception handling is configured to, in response to detection of an exception during a function call, search for an exception handler to handle the detected exception by unwinding a stack across a plurality of frames. A binary includes functions associated with one of a first application binary interface (ABI) or a second ABI. The stack includes a transition frame created between frames of the first ABI and the second ABI during execution of the binaries. The system is configured to detect the transition frame in the stack when encountering a change from a frame of one ABI to a frame of another ABI, and translate an interface context therebetween to handle the exception.

20 Claims, 7 Drawing Sheets

(56) References Cited

U.S. PATENT DOCUMENTS

| | | | | |
|---|---|---|---|---|
| 7,281,271 | B1* | 10/2007 | Szor | G06F 21/52 |
| | | | | 713/165 |
| 9,448,788 | B1* | 9/2016 | Barua | G06F 8/70 |
| 2003/0018961 | A1* | 1/2003 | Ogasawara | G06F 8/4441 |
| | | | | 717/158 |
| 2003/0023905 | A1* | 1/2003 | Boling | G06F 9/4812 |
| | | | | 714/34 |
| 2008/0216073 | A1* | 9/2008 | Yates | G06F 9/30174 |
| | | | | 718/100 |
| 2008/0270990 | A1 | 10/2008 | Kornstaedt | |
| 2009/0172713 | A1* | 7/2009 | Kim | G06F 9/30145 |
| | | | | 719/331 |
| 2011/0066959 | A1* | 3/2011 | Harrold | G06F 8/33 |
| | | | | 715/762 |
| 2015/0007304 | A1* | 1/2015 | Malka | G06F 21/54 |
| | | | | 726/17 |
| 2017/0097835 | A1 | 4/2017 | Tzen et al. | |

* cited by examiner

STACK FRAME UNWINDING FOR EXCEPTION HANDLING

BACKGROUND

Application Binary Interfaces (ABIs) provide interfaces between program modules (e.g., between an application and an operating system) and define different details, such as how functions are called and how exceptions are handled. For exception handling, the ABIs define how an exception is evaluated and how execution can be restored after the exception has been handled. The process of exception handling may include walking the calling stack to identify potential handlers, as well as to restore execution at a point chosen by the handler.

In emulation environments, compiled hybrid binaries offer near native performance and complete interoperability with the platform being emulated. A compiled hybrid binary is mostly indistinguishable from other emulated binaries on its interface, while some code has been replaced with emulation host-native code, compiled directly from source code.

While executing emulated code with compiled hybrid binaries, the call stack may contain frames formatted according to two distinct ABIs, including the ABI of the emulation host and the ABI of the emulation guest. Because the stack may contain frames of different ABIs, conventional exception handling techniques cannot handle exceptions in this environment, such as an exception generated by one frame of one ABI to be handled by a frame of another ABI. Thus, exception handling of the ABI in compiled hybrid binaries cannot be reliably and accurately performed in existing systems.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for exception handling comprises searching for, in response to detection of an exception during a function call, an exception handler to handle the detected exception by unwinding a stack across a plurality of frames, the plurality of frames including a binary having functions associated with one of a first application binary interface (ABI) or a second ABI, and the stack including a transition frame created between frames of the first ABI and the second ABI during execution of the binary. The computerized method further comprises detecting the transition frame in the stack when encountering a change from a frame of the first ABI to a frame of the second ABI and translating an interface context of the first ABI to an interface context of the second ABI to unwind the frame of the second ABI using the translated interface context, wherein the exception handler follows exception handling of the second ABI. The computerized method also comprises handling the exception with the exception handler following exception handling of the second ABI using the translated interface context.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

Corresponding reference characters indicate corresponding parts throughout the drawings. In the figures, the systems are illustrated as schematic drawings. The drawings may not be to scale.

DETAILED DESCRIPTION

The computing devices and methods described below are configured to reliably and accurately handle exceptions in a stack that may contain frames of different ABIs (e.g., frames formatted according to two distinct ABIs). An exception handling infrastructure and ABI transition code enable such exceptions to be handled while executing emulated code with compiled hybrid binaries (e.g., the ABI of an emulation host and the ABI of an emulation guest). The exception handling infrastructure includes the use of transition frames created between frames of the different ABIs during execution of the complied hybrid binaries. The transition frames enable exception handling in a compiled hybrid environment.

In various aspects, exception handling is performed by walking a call stack to identify a handler to handle the exception when performing frame-based exception handling. During the walking, frames of different ABIs may be encountered, which are identified by detection of the transition frames. The transition frames provide information for the translation of an interface context from one of the ABIs to the other ABI. By using transition frames between frames of different ABIs, two stack unwinders, which may be of very distinct ABIs, are linked so that the both stack unwinders can participate and resolve a single exception that spans both architectures. In this way, exceptions can be handled across frames of a stack having different ABIs using an exception handling mechanism that can both dispatch the exception and unwind the stack across a number of ABI transitions. In some examples, different exception handling methods are followed by the different frames. In some examples, other exception handling methods may be performed, such as chain-based exception handling or vector-based exception handling.

Thus, an exception generated by a frame of one ABI can be handled by a frame of another ABI using various aspects of the disclosure, including accurately performing stack unwinding by determining the context of each frame, even across ABI and processor architecture boundaries. Additionally, debuggers are enabled to correctly display the execution stack trace with local registers and variables of each frame.

Because exception handling is an integral part of code execution, compiled hybrid execution is incomplete without practicing the computing devices and methods described herein. Improved performance also results when performing emulation because translations are not needed along every step of the exception handling.

Exception handling may be performed using different methods across the different frames of the stacks, depending on the type of exception handling methods. Examples of different exception handling methods are next described.

Exemplary Exception Handling Methods

Figure 1:
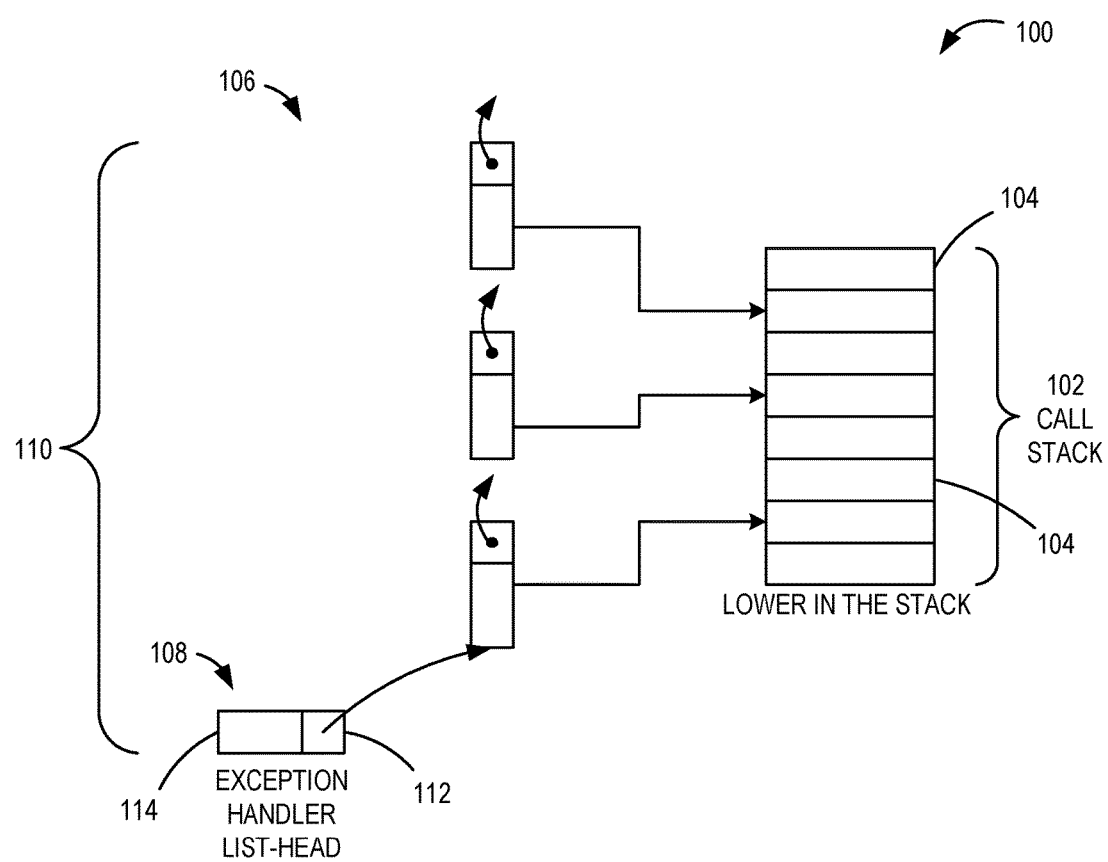
FIG. 1 is an exemplary block diagram illustrating chain-based exception handling according to an embodiment.
Figure 2:
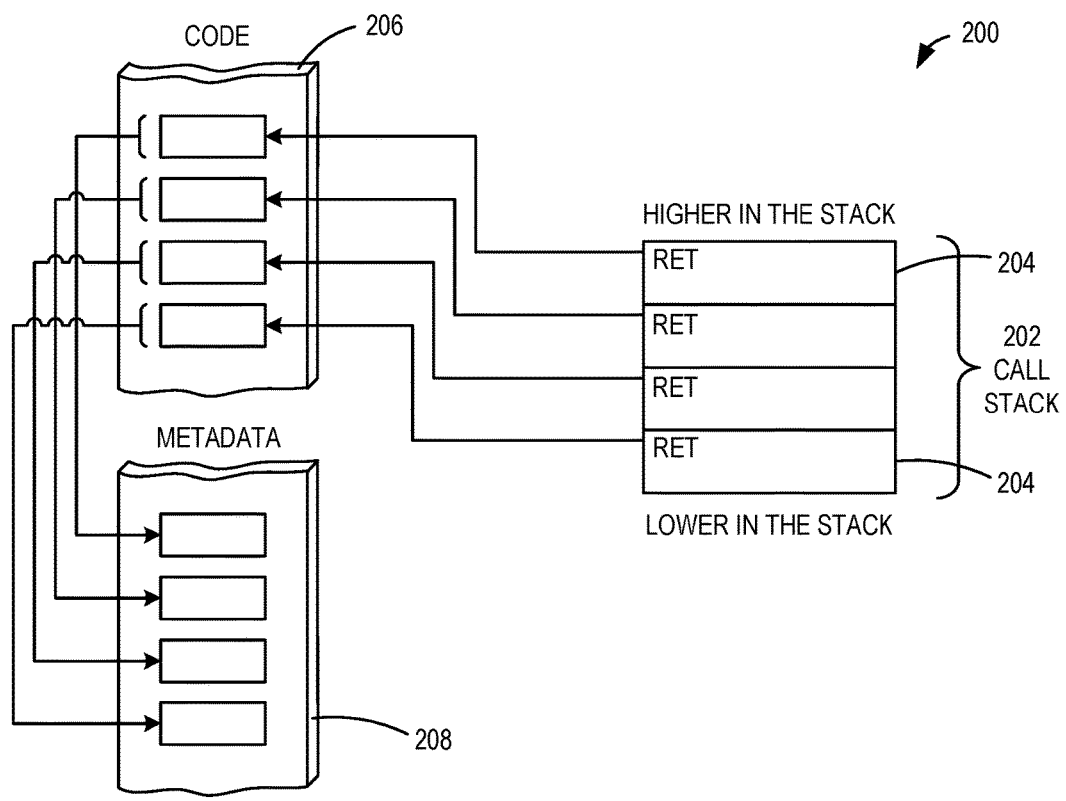
FIG. 2 is an exemplary block diagram illustrating frame-based exception handling according to an embodiment.

Examples of chain-based exception handling and frame-based exception handling (also referred to as table-based exception handling) are illustrated in FIGS. 1 and 2. While various aspects of the disclosure utilize these types of exception handling, other types of exception handling may be used, such as vector-based exception handling, step-jump, long-jump exception handling. Additionally, while various aspects are described in connection with examples using x86 and/or ARM64 as specific architectures, other Complex Instruction Set Computing (CISC) and/or Reduced Instruction Set Computing (RISC) architectures may be used within the scope of the disclosure.

With reference to FIG. 1, chain-based exception handling 100 may be performed, for example in connection with an x86 architecture in a Microsoft® Windows® platform. In the illustrated embodiment, a call stack 102 (also referred to as a stack) includes a plurality of frames with the frames 104 in the call stack 102 toward the bottom as viewed in FIG. 1 being lower in the stack and the frames 104 in the call stack 102 toward the top as viewed in FIG. 1 being higher in the stack. The call stack 102 is the execution context of a thread. The thread always executes within a function, and the call stack 102 holds the local variables of the function and the arguments to the function.

In operation, applications use one operating system application programming interface (API) to register a handler routine 106 which will be called by the operating system every time an exception fitting a desired category occurs. In the illustrated embodiment, this process includes accessing an exception handler list 110.

With respect to the chain-based exception handling 100 (e.g. Windows® x86-32), in this ABI, at runtime, each function that may handle exceptions raised by itself or a child function needs to add a standard-formatted element to the exception handler list 110, illustrated as a single-linked list (wherein an exception handler list-head 108 is the top of the exception handler list 110. The element contains a pointer 112 to the next element (the one higher in the stack 102) as well as a single payload member 114 that identifies the exception handler routine. In the case of an exception, the operating system's role in this ABI is to invoke the handlers in the exception handler list 110, starting with the top of the exception handler list 110 (associated with the lower frames 104 in the stack 102). In a dispatch pass, the operating system invokes the handlers until one of the handlers expresses an intention to handle the exception. In an unwind pass, the operating system also invokes the handlers and removes the handlers from the exception handler list 110 when the frame 104 with which the handler is associated is set to be eliminated. In this ABI, the final unwind handler (which is part of the application's code) restores the required CPU context before resuming execution. This means that the compiler has to generate code that, at runtime, intervenes to an extent beyond a mere decision logic. Not all frames 104 require a handler. For example, if a function does not need to handle an exception nor need to take mitigation action when being eliminated, then the function does not add a handler when invoked.

With reference now to FIG. 2, frame-based exception handling 200 is illustrated, for example in connection with an ARM64 architecture in a Microsoft® Windows' platform. In the illustrated embodiment, a call stack 202 includes a plurality of frames with the frames 204 in the call stack 202 toward the bottom as viewed in FIG. 2 being lower in the stack and the frames 204 in the call stack 202 toward the top as viewed in FIG. 2 being higher in the stack. Handlers are called depending on the relative position of the handlers in the stack 202 at the time the exception occurs.

In operation, frame-based exception handling 200 (and chain-based exception handling) is performed in one or two passes of the call stack 202 depending on the type of resolution to the exception. For example, a dispatch pass invokes each exception handler, in order from the exception handlers associated with functions lower in the stack 202, to higher in the stack 202. Each handler may choose to:

(1) Not handle the exception. This means that the operating system (OS) will keep looking for the next handler, higher in the stack 202;

(2) Resume the execution, with or without context adjustment. This is used when the handler wants to retry the operation that faulted, after the handler has made the necessary adjustments, so that the operation that previously failed can now pass on the retry. Such adjustments may include, for example, modifying parts of the CPU context or memory; and (3) Unwind the stack 202 up to the frame 204 that is associated with the handler. This then triggers the second pass.

An unwind pass is invoked if the handler decides to unwind the stack 202, then all the frames 204 that in the stack 202 below the frame 204 handling the exception are eliminated and execution is set to resume at the frame 204 associated with the handler that initiated the unwind. All required state (callee-saved registers) is restored as if all the child frames have returned normally. However, no function code from any of the child frames executes. Instead, during this pass, child frames still have a chance to clean-up or free essential resources. As the operating system is performing the unwind, eliminating each frame 204, the operating system invokes once more all of the handlers that are associated with the frames 204 being eliminated, in the same order as the dispatch pass. In this pass, handlers do not handle the exception, but the handlers instead may choose to perform any cleanup that is fundamental in case of an exception, if needed.

It should be noted that the above-discussion relating to the operational passes across the frames described in connection with the frame-based exception handling 200 is also performed in the chain-based exception handling 100. However, in the chain-based exception handling 100, a linked-list is used as described herein. This linked-list roughly mimics the call-stack (e.g., the stack 202), but it is not the stack itself.

However, in the frame-based exception handling 200, the stack itself (e.g., the stack 202) is used to travel from child to parent frames. In this method, the OS uses metadata in the binary (added by the compiler) to:

a) For every frame 204, know how to restore the registers regarding the parent frame; and b) Know what is the handler for the function in each frame 204.

Frame-based exception handling 200 requires more operating system intervention than chain-based exception handling 100, because in this type of handling, the operating system discovers and dispatches the exception information to all of the potentially interested parties in the stack 202.

The actual amount of application code 206 (each function with the associated metadata) that executes as part of the dispatching operation varies with each specific ABI.

As a specific example of the frame-based exception handling 200 (Windows® ARM64), this ABI follows a class of exception handling design that is more based on function metadata and stack frame (virtual) unwind. For example, given functions fa( ) and fb( ) where fa( ) calls fb( ), the stack frame (virtual) unwind transforms a given CPU context set representing an arbitrary execution point inside fb( ) into another CPU context set that represents the relevant portions of the CPU context at the time fa( ) called fb( ). This operation is performed without executing any instruction code 206 provided by the application. Instead, this operation uses metadata 208 that is provided by the application, and was generated by the compiler, that describes each function, specifically, where the function saves registers that need to be preserved in the stack 202 and, optionally, the exception handler routines. Each of these pieces of information about a function is named an unwind opcode. In this form of exception handling, namely frame-based exception handling 200, frame-based or virtual unwinding drives both the dispatching and the unwind phases. Frame-based or virtual unwinding requires valid CPU context set to initiate the process of walking the stack up, one frame at a time. The context produced by one unwind step can be fed onto the next. The context that is provided to the first operation is usually either the context representing the state of the CPU at the time of the fault/exception, or the context representing the frame 204 where the process is being initiated, being the bottom-most valid frame 204. It should be appreciated that the dispatch phase is initiated with the former, and the unwind phase initiated with the latter.

Other exception handling methods, such as vector-based exception handling may be performed. In this method, applications use an OS API to register a handler routine which will be called by the OS every time an exception fitting the desired category occurs. This method presents a composition problem. Namely, because there is generally only room for one handler, it is complex to ensure that distinct software modules composing an application, being used together in the same process, can each handle their own exceptions without devising ah-hoc cooperative hand-off schemes. The frame-based exception handling 200 (or chain-based exception handling 100) described herein addresses the composition shortcomings of vector-based exception handling by leaving the OS the task of determining the sequence by which the handlers should be called (i.e., depending on the relative position of the handler in the stack or in a list at the time the exception occurs).

The exception handling methods may be used in combination with compiled hybrid binaries. A computing device that may create hybrid binaries is next described.

Exemplary Computing Device Creating Hybrid Binaries

Figure 3:
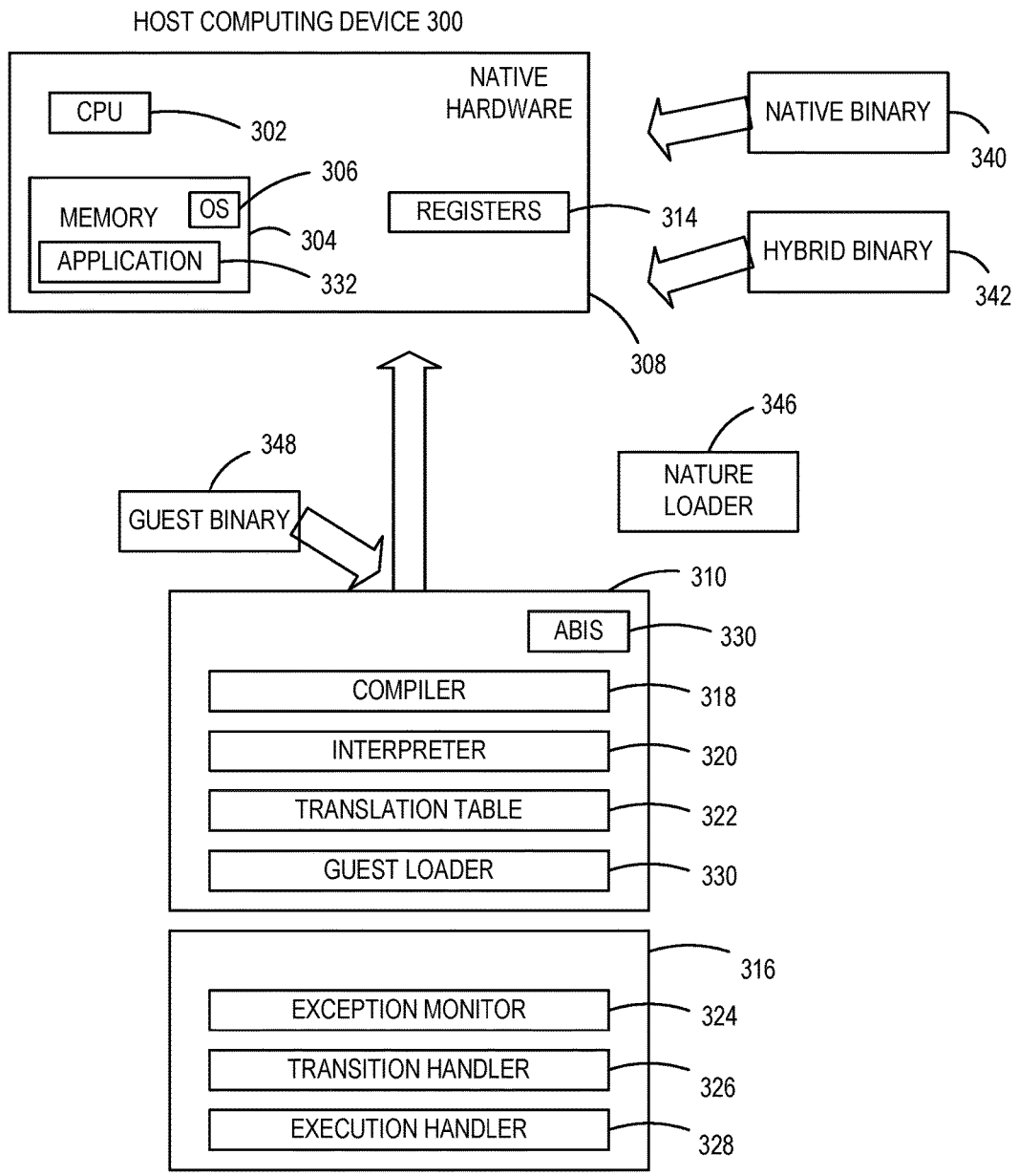
FIG. 3 is an exemplary block diagram illustrating a host computing device according to an embodiment.

FIG. 3 illustrates a host computing device 300 in accordance with one aspect that is configured to compile code to create hybrid binaries (e.g., a Hybrid x86$_{/ARM64}$ compiled hybrid binary) in an emulation environment, and perform exception handling across frames in a stack having distinct ABIs. The host computing device 300 provides functionality to various applications via one or more interfaces such as APIs or application binary interfaces (ABIs). In one aspect, the host computing device is configured as a native host machine wherein hybrid binaries are used for guest applications implemented on a native host. A hybrid binary is a special native binary that has been compiled to facilitate interoperability with a guest architecture emulator, and the host computing device 300 may be, for example, an ARM 32 or ARM 64 architecture based machine.

The host computing device 300 may include native hardware 308. The native hardware 308 may include components such as a CPU 302, memory 304 and registers 314. The native hardware 308 is configured to natively execute binaries created for the native architecture. For example, FIG. 3 illustrates a native binary 340 and/or a hybrid binary 342 that can be executed directly on the native hardware 308.

The CPU 302 is operably connected to the memory 304. For example, the CPU 302 can be a RISC or CISC microprocessor that is connected to the memory 304 via a bus. The CPU 302 may include one or more processors and the memory 304 may be a volatile storage device, such as a random-access memory (RAM), or a non-volatile memory such as FLASH memory.

The memory 304 of the host computing device 300 may include various components that implement certain processing described herein. For example, the memory 304 can include a host operating system (OS) 306 and one or more applications 332. The host OS 306 can be a fully functional operating system such as found on a modern personal computer, server, tablet, cell phone, or other computing device. For example, the host OS 306 can be a version of Windows®, Unix®, Linux®, a real-time and/or embedded operating system, etc. The host OS 306 may include one or more binary files that are in a native or emulated instruction set architecture (ISA).

The host computing device 304 may also include an emulator 310 and an exception monitor 316. The emulator 310 runs on the native hardware 308, but is configured to handle guest binaries. For example, the emulator 310 may be an x86 emulator. This configuration would allow x86 guest binaries 348 to be executed on the host computing device 300 by appropriately translating an x86 interface context into functionality of the host computing device 300 operating as a native host machine.

In some aspects, the hybrid binary 342 is created from guest source code, but executes (for the most part) directly on the native hardware 308 without the need to be executed using the emulator 310. Guest source code in some aspects includes all high level and assembly level code files, and corresponding compiler settings and preprocessor defines, associated with compiling for the guest architecture. In operation, a hybrid shared object and its imports are loaded and processed by a guest loader 344. A mechanism (such as a new machine type or presence of a special emulator directory) is used to convey to the emulated guest loader 344 that the target binary is a hybrid binary. It should be noted that processing may require assists from a native loader 346 to process functions that are not understood by the guest loader 344. In various aspects, the native loader 346 is notified of each hybrid binary load to ensure that the native exception handling information is properly registered with the system.

The emulator 310 may be configured to compile a set of instructions for different ISAs. The emulator 310 may also be configured to obtain a previously-translated set of instructions. For example, the emulator 310 may be configured to track instructions that have already been compiled and use the previously-compiled instructions rather than recompiling them. The emulator 310 may also interpret and/or just-in-time compile instructions.

In some aspects, the host OS 306 may implement lower-level operating system functionality such as timers, interrupts, input/output, pointer validation, etc. It should be noted that the application 332 may include one or more binary files. These binaries can be translated by the emulator 310 into the host ISA and run directly on the CPU 302 in the host ISA.

In some aspects, the emulator 310 may maintain a translation table 322. For example, the translation table 322 may be used by the emulator 310 to check whether a particular set of instructions have been translated and loaded for execution. By doing this check before translating the instructions with the compiler 318, or the interpreter 320, the emulator 310 avoids compilation overhead. It should be noted that the term "table" is used generically to refer to different data structures and that the translation table 322 may be implemented using arrays, structures, classes, linked lists, trees, etc.

The emulator 310 may also include a compiler 318, and/or an interpreter 320. Using the compiler 318 (which may be configured as a pre-compiler or a just-in-time compiler), the emulator 310 translates binary files between ISAs. For example, the compiler 318 may translate the binaries before the binaries are invoked for execution, e.g., the compiler 318 may translate binaries offline. Likewise, the compiler 318 may translate the binaries before execution. For example, the compiler 318 may load one or more binaries from storage into the memory 304, translate the binaries, and store the corresponding binaries for later usage.

In some instances, precompiling is not used. For example, a user may request an operation, such as to initiate the application 332 on the host computing device 300 before precompiled binaries are obtained by the emulator 310. As another example, code may be generated at runtime in a particular ISA, which needs to be translated while the application 332 is already running. In this case, the binaries can be translated at runtime by the compiler 318 and/or the interpreter 320.

In general, the compiler 318 compiles a group of instructions the first time the instructions are executed, caches the compiled instructions as one or more binaries, then executes the cached binaries each time the corresponding binaries are invoked afterwards. In contrast, the interpreter 320 translates instructions and generally does not compile or cache the translated instructions. Rather, each time instructions are invoked, the interpreter 320 performs the translation and executes the instructions, but does not retain the translated instructions for later use.

Different types of compiled hybrid binaries are contemplated by the present disclosure. Examples of some hybrid binaries that may be compiled by the host computing device 300 are next described.

Compiled Hybrid Binaries

In some aspects, the compiler 318 creates hybrid binaries that are executed by the emulator 310. In operation, the emulator 310 has access to the translation table 322 for input translation when switching ABIs 330. For example, the compiler may generate hybrid compiled code that allows x86 binaries to run on an ARM64 architecture. Thus, part of the OS appears to be the same as the application 332, but the code is replaced with the code adhering to the device ABI (host ABI), which is native to the device. During operation, when modules call each other, using the ABIs 330, exceptions can occur unexpectedly, out-of-band, and/or out of the normal flow. To handle exceptions, various aspects include perform exception handling across frames that may be from distinct ABIs 330, which includes searching for a handler to handle the exception (e.g., walk the stack in frame-based handling), such as looking for registered exception handlers/catch blocks/etc.

In emulation environments, where compiled hybrid binaries offer near native performance and complete interoperability with the platform being emulated, on its interface with other binaries, a compiled hybrid binary is mostly indistinguishable from any other binary for the ABI being emulated. However, some of the code contained within may have been replaced with host-native ISA code, compiled directly from source code.

For example, a hybrid x86/ARM64 compiled hybrid binary appears as just another x86 binary to all other x86 binaries in a program. However, portions within the compiled hybrid binary may have been replaced with ARM64 code generated by the hybrid compiler, directly from source code. During execution, the emulator recognizes that these functions have been already translated to ARM64 and understands that the emulator does not need to trans-compile these functions, but only needs to directly execute the functions. Various aspects perform exception handling across frames of the stack of compiled hybrid binaries that may include different ABIs.

Since compiled hybrid binaries need to provide a seamless interface with code from the emulated ABI, this means that at least on the interface, the hybrid code needs to obey the emulated calling convention. Accordingly, the parameter-passing between code in each side of the interface must follow the same rules that govern which parameters go to the stack and registers, and which registers are caller and callee preserved. In this context, the same registers across different architectures means the registers are equivalent according to the emulator's register mapping rules.

While the calling convention around the interface needs to obey the ABI of the emulated architecture, in practice, once the interface is crossed, the hybrid code frequently follows its own common ABI. This allows the compiler for the hybrid code to be mostly reused from that architecture's existing compiler with only slight modifications, reducing the research and development cost for the hybrid compiler and auxiliary tools. Again, using x86/ARM64 as example, the calling convention to be used on the interface between x86 and hybrid-ARM64 must follow x86 rules. However, once the interface has been crossed into hybrid-ARM64, the code is generated mostly the same way as pure ARM64 code, with only small modifications. When a hybrid function calls into another hybrid function, the call does not need to adhere to x86 calling conventions and, in practice, follows mostly the ARM64 calling convention. This way, when producing an x86/ARM64 binary, x86 code gets generated with the pre-existing x86 compiler, hybrid-ARM64 code gets generated with the slightly-tweaked-but-mostly-preexisting ARM64 compiler, and the only code that is truly new is the code that executes around the interface—the push and pop thunks.

Beyond parameter-passing and register saving, another part of the ABI that is different between architectures in a hybrid binary is exception handling. Exception handling is part of the ABI and, therefore, platform specific. Similar to the discussion above, emulated code (even emulated code hosted in a hybrid binary) handles exceptions just like code does on any other binary of that same architecture that is not hybrid. Hybrid-host code included into a hybrid binary handles exceptions in a very similar way as exceptions are handled on a binary of the host's native architecture, with minor alterations. Returning to the example, in an x86/ARM64, binary code handles exceptions just like x86 code handles exceptions elsewhere, and hybrid-ARM64 code within handles exceptions mostly as other ARM64 exceptions are handled in pure ARM64 binaries. As should be appreciated regarding x86 and ARM64, these architectures have different ways of handling exceptions, not only to reflect the differences in the ISA, but the architectural differences.

Various aspects of the disclosure perform exception handling across a compiled hybrid binary having different ABIs. Exception handling is next described.

Exception Handling

Figure 4:
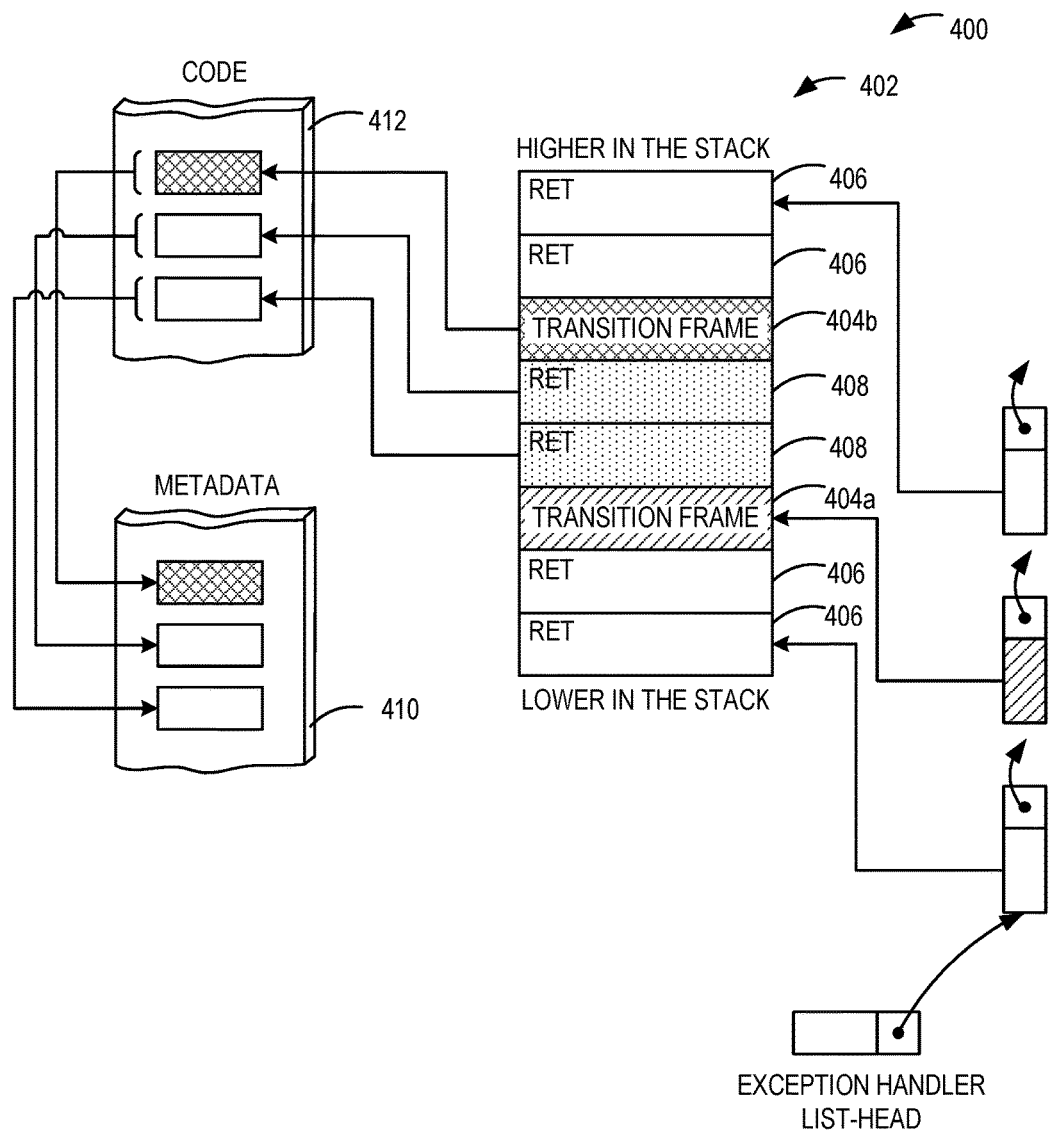
FIG. 4 is an exemplary block diagram illustrating hybrid exception handling according to an embodiment.

In one aspect, and with reference to FIGS. 3 and 4, the host computing device 300 includes the exception monitor 316 to monitor for exceptions (e.g., faults) and control the fault handling, which is performed across frames having different ABIs 330. The exception monitor 316 in the illustrated embodiment includes an exception dispatch mechanism 324, a transition handler 326 and an execution handler 328. However, the functionality of these elements may be embodied in additional, or fewer, elements in other implementations.

Once hybrid shared objects are introduced, it becomes difficult to pass exceptions between emulated and hybrid code. Except for a few special cases, the exception context becomes meaningless once the emulation boundary is crossed. For example, emulated code cannot reasonably inspect and modify an exception context that references code inside a hybrid module. Furthermore, due to the loss of fidelity when a native host context is converted to a guest context, it may not even be possible for an emulated handler to blindly restore a native exception. Aspects of the disclosure eliminate these difficulties.

The exception monitor 316 handles exceptions that may occur in the different ABIs 330 (e.g., exceptions in hybrid code or within emulated code) across the frames 406 and 408 using, in part, transition frames 404 that are created when transitions occur between the frames 406 and 408 having the different ABIs 330. For example, the transition frames 404 are created by the compiler 318 when building the OS. In one aspect, the compiler 318 creates wrapper functions when going between the frames 406 and 408 having the different ABIs 330 (e.g., only if being called from functions of different ABIs 330) that create the transition frames 404, thus allowing later exception handling across frames 406 and 408 from distinct and different ABIs 330 during unwinding of the stack 402. In one example, x86 code is interpreted or translated to ARM64 code. In some aspects, the emulator 310 runs the application 332 and the emulator 310 know whether to call the wrapper function.

In some aspects, the different ABIs 330 having different exception handling methods results from differences in compatibility. That is, the difference in the ABIs 330 may be an incompatibility between the ABIs 330. Some examples of incompatibility include:
1. Attempting to handle an exception from the first ABI using the method of handling an exception from the second ABI causes an exception;
2. Attempting to handle an exception from the first ABI using the method of handling an exception from the second ABI results in loss of information from the exception;
3. Attempting to handle an exception from the first ABI using the method of handling an exception from the second ABI results in unpredictable behavior (e.g., reliance on particular data stored in predefined location based on first ABI, where second ABI exception either does not define, or allows arbitrary values in, that predefined location);
4. Attempting to switch between the first ABI to the second ABI causes an exception;
5. Attempting to switch between the first ABI and the second ABI results in loss of information from the exception; and
6. Attempting to switch between the first ABI and the second ABI results in unpredictable behavior (e.g., reliance on particular data stored in predefined location based on first ABI, where second ABI exception either does not define, or allows arbitrary values in, that predefined location).

In operation, when an exception handler is called, information about the exception is passed in. It should be noted that some of this description is ABI-specific. For example, if function C faulted, but does not want to handle the fault, then function B might handle the fault. But, function B has a different ABI, so the information passed to function B will cause the function B handler to behave poorly without aspects of the disclosure. Specifically, one or more aspects of the disclosure take the information from the one ABI 330, look at the translation table 322 that maps registers between the two ABIs 330, and translate the fault information into the other ABI 330. In one aspect, the exception dispatch mechanism 324 performs this translation (e.g., the part of the OS that is asking the handlers one at a time who wants to handle the exception). The handlers are provided by the functions. It should be noted that the translation table 322 in some aspects is configured as an emulator table that maps registers and is established at design time.

Thus, in emulation environments supporting compiled hybrid binaries, at any moment during runtime there can be frames produced by both the hybrid-host and emulated-guest code. In this example, the hybrid-host and emulated-guest code follow different ABIs 330, including how exceptions are handled. It should be noted even if the code that gets compiled to be hybrid-host can be controlled (and never change), the presence of callbacks and other composition artifacts enable third party application code to compose a single execution stack that contains many layers and transitions between hybrid-host and emulation-guest frames. By practicing various aspects, an exception occurring in one frame can be handled and, optionally, unwound to any other frame higher in the stack even when the frame 408 handling the exception is of a different ABI 330 than the frame 406 that originated the exception/fault.

Specifically, the exception monitor 316 is configured to provide mechanisms for exception handling that can both dispatch the exception and unwind the stack 402 across any arbitrary number of ABI transitions, even when these follow very distinct models including the chain-based exception handling 100 and the frame-based exception handling 200. The exception monitor 316 also feeds the handler routines of each of the chain-based exception handling 100 and the frame-based exception handling 200 the parameters in a form that matches existing code expectation, that prevents having to otherwise significantly modify the code when recompiling the code to the hybrid-host.

The exception dispatch mechanism 324 is configured to, in response to detection of an exception during a function call, search for an exception handler to handle the detected exception by unwinding a stack across a plurality of frames. The plurality of frames includes frames created by both an emulated binary and a hybrid binary in some aspects, with each of the binaries being associated with one of a first ABI 330 or a second ABI 330. In this example, the first and second ABIs (e.g., x86 and ARM64) have different exception handling methods. As described in more detail below in connection with FIG. 4, which illustrates a hybrid-based exception handling 400, a stack 402 includes one of more transition frames 404 created between frames 406 of the first ABI and frames 408 of the second ABI during execution of the emulated and hybrid binaries.

The transition handler 326 is configured to detect the transition frame 404 in the stack 402 when encountering a change from a frame 406 of the first ABI to a frame 408 of the second ABI, or vice versa. In one aspect, the transition frame 404 contains an exception handler that follows exception handling of the second ABI by translating the interface context of the first ABI to the interface context of the second ABI to unwind the frame 408 of the second AB. The execution handler 328 is configured to translate the interface context from the first ABI to the second ABI.

In some aspects, the transition frame 404 performs the following actions:]
1. Informs the system exception handling mechanism that an ABI switch is taking place; and
2. Retrieves information relevant to the exception handling mechanism taking over. This may be either:
    a. Generating a seeding context for a virtual-unwind, as used by frame-based exception handling 200; or
    b. Retrieve the next element in the exception handling chain, as used by a chain-based exception handling 100.

In some aspects, the first ABI is one of the chain-based exception handling 100 or the table-based exception handling 200, and the second ABI has the other one of the chain-based exception handling 100 or the table-based exception handling 200. That is, the frames 406 and the frames 408 have different exception handling methods in some aspects.

With reference now to FIG. 4 illustrating the hybrid-based exception handling 400 and also with continued reference to FIG. 3, the frames 406 higher in the stack 402 represent a function A in the ABI 330 of the application 332 and the frames 406 lower in the stack represent a function C also in the ABI 330 of the application 332. However, the frames 408 in the stack 402 represent a function B that is in the ABI 330 of the device. Thus, in this example, function A calls function B that calls function C (in time). It should be appreciated that time lapse is represented from higher to lower in the stack 402 with exceptions handled from lower to higher in the stack 402. It should also be noted that in some aspects, the stack 402 is generated from higher to lower numerical addresses.

Returning to the example of FIG. 4, the frames 406 are created by functions of an ABI 330 that use the chain-based exception handling 100 and the frames 408 are created by functions of an ABI 330 that uses the frame-based exception handling 200. In operation, the complete hybrid exception dispatched/unwinder of various aspects transitions between the two ABIs 330, maintaining the necessary state to function, transition and eventually resume control between potential gaps.

In one aspect, the transition frames 404 enable the emulator 310 to transition between the emulated execution and the pre-compiled execution, adapt parameter passing rules (also part of the ABI 330), map host-guest registers, and save any registers that need to be preserved across a function call, but which are not mapped into the architecture to which it is transitioning. For example, in an x86-32/ARM64 hybrid, the transition frame 404 from a hybrid-ARM64 function to a cdecl-x86-32 function will have to save the ARM64 registers that are callee-saved by convention, but are not mapped into x86-32 registers (ARM64 has far more registers than x86-32). The transition frame 404 also pushes some parameters onto the stack 402, as ARM64 passes some parameters via the register, whereas most x86-32 calling-conventions, like cdecl, pass parameters strictly via the stack 402. Additionally, the transition frame 404 triggers the emulator 310 into initiating the emulation of the code that is the target of the call.

It should be noted that registers that have no mapping are saved in the transition frame 404 because the code running as x86 could utilize cooperative micro-threading techniques, such as fibers, to interleave/multiplex the execution of multiple stacks onto the same thread. For this to work, the stack/fiber swapping operation saves all the registers that need to be preserved on a call. Since some registers do not have mapping, those registers are not saved. It also should be noted that interleaving the other sequences of code that could potentially also transition into ARM64, could modify the ARM64 unmapped registers between an apparent call and return. Thus, it cannot be assumed that unmapped registers are safe when transitioning onto an architecture that does not have a mapping for these registers.

Thus, to enable exception handling across these transitions, the transition frame 404 also switches between different dispatcher/unwinder methods to match the compiled code transition, providing enough information to seed the exchange. In various aspects, the transition frames 404 contain, themselves, exception handlers that follow the ABI 330 that is lower in the stack 402 of the transition.

For example, in x86-32/ARM64, the transition frame 404a that represents a call from hybrid-ARM64 into x86-32 or, seeing the transition frame 404a from the perspective of the exception handling mechanism, the transition frame 404a that represents a return from x86-32 onto Hybrid-ARM64 contains an exception handler that follows (e.g., handles) the exception using the x86-32 ABI (e.g., a corresponding element into the exception handler chain). Conversely, the transition frame 404b that represents a return from hybrid-ARM64 onto x86-32 has an exception handler that follows the hybrid-ARM64 ABI (e.g., the function that performs the transition has a specific opcode 412 in metadata 410 indicating its presence).

Figure 5:
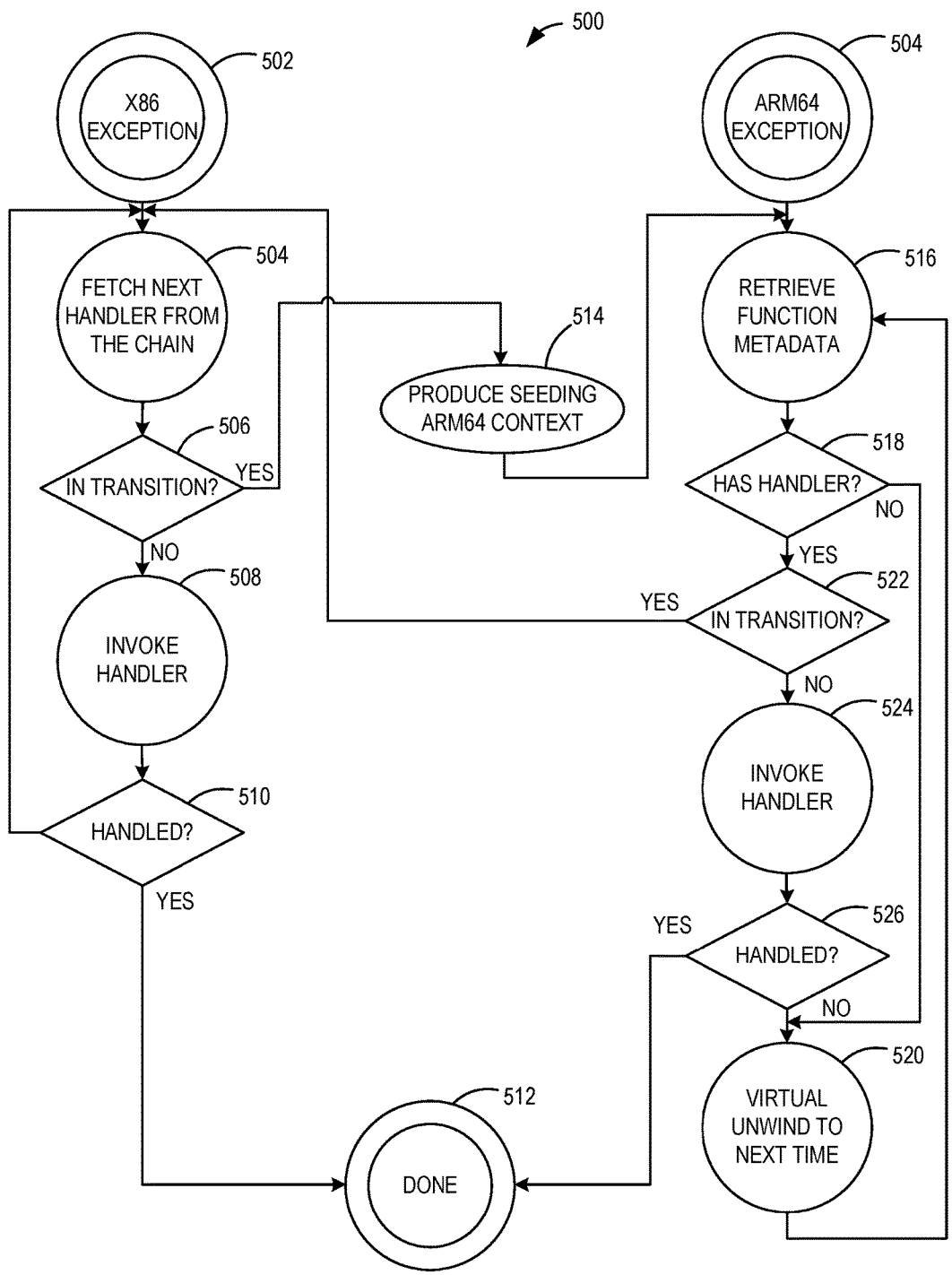
FIG. 5 is an exemplary flow chart illustrating operation of a computing device for hybrid exception handling according to an embodiment.

FIG. 5 illustrates an exception handling method 500 wherein the exceptions for different frames are handled using different exception handling methods. In particular, this figure is an exemplary flow chart illustrating operation of a computing device (e.g., the host computing device 300) to perform exception handling across frames of a stack having different and distinct ABIs. In the state diagram of FIG. 5, the exceptions are illustrated as an x86 exception 502 and an ARM64 exception 504. The method 500 generally defines a method for exception handling for a hybrid exception dispatcher (or exception unwinder), which may be performed by the exception monitor 316 illustrated in FIG. 3. In this example, the x86 exception 502 is handled using the chain-based exception handling 100 (such as illustrated in FIG. 1) and the ARM64 exception 504 is handled using the frame-based exception handling 200 (such as illustrated in FIG. 2).

As described in more detail herein, for the x86 exception 502, a next handler (e.g., corresponding to a next frame) is fetched from the chain at 504. A determination is the made at 506 as to whether a transition between frames of different ABIs is detected, which in various aspects is determined by identifying the presence of the transition frame 404 (shown in FIG. 4). If no transition is detected at 506, then at 508 the handler is invoked at 508 using the chain-based exception handling 100. A determination is then made at 510 as to whether the exception has been handled. If the exception has been handled, then the exception handling methods is completed and the method ends at 512. However, if the exception has not been handled (e.g., the current handler does not handle the exception), then the next handler in the chain is fetched at 504.

Returning now to the determination at 506 whether a transition is detected, if instead a transition is detected, which indicates that there is a change in exception handling (in this example, a change to the frame-based exception handling 200) as a result if changing from a frame of one ABI to a frame of another ABI, a seeding ARM64 context is produced at 514 in order to then retrieve function metadata at 516 used in the frame-based exception handling 200. As described herein, the seeding context is provided by the transition frame that generates the information needed to perform the frame-based exception handling 200. In particular, virtual unwind operations for the frame-based exception handling 200 require a seeding context. The seeding is performed by the transition handler itself that gathers the required information from the stack. More specifically, the transition frame 404 reproduces the significant portions of the CPU context representing the state immediately prior to the call into the transition. The transition frame may contain seeding context for an exception handler that follows exception handling of the second ABI (ARM64 in this example). It should be noted that if an ARM64 exception is detected at 504, the method 500 similarly will retrieve the function metadata at 516.

A determination is then made at 518 whether a handler is present. If a handler is not present (e.g., a handler is not willing to handle the exception) then a virtual unwind to the next frame is performed at 520 and the next function metadata is retrieved at 516. If a handler is present at 518, then a determination is made at 522 whether a transition is detected. If a transition is detected, then the exception handling is switched to the chain-based exception handling 100 and a next handler is fetched from the chain at 504. It should be noted that at this transition, no seeding is produced. In particular, exception chain operations to be performed by the chain-based exception handling 100 do not require seeding information other than the pointer to the next element in the exception chain. This means that the role of the transition handler into an exception chain based exception handling mechanism is much simpler. The transition only needs to ensure that the pointer is preserved from the last transition into the virtual unwind based mechanism.

If no transition is detected at 522, then a handler is invoked at 524 (e.g., by a call operation to the handler). A determination is then made at 526 whether the exception has been handled. If the exception has not been handled, then a virtual unwind to the next frame in the stack is performed at 520 and another function metadata is retrieved at 516. If the exception is handled at 526, then the exception handling method is completed and the method ends at 512.

Thus, in various aspects, upon determining that the transition frame is present, the device, at 506 or 522, translates the interface context of the first ABI to interface context of the second ABI using the information present in the transition frame. Translating the interface context into the second ABI may imply producing a seeding processor context from the information stored in the transition frame at 514 if the target ABI uses frame-based exception handling 200, or simply retrieving the next handler in the list at 504 if the second ABI uses chain-based exception handling 100. In various aspects, "interface context" generally refers to the exception handling relevant information at each side of the transition frame.

It also should be noted that the example of the x86 exception 502 being handled using the chain-based exception handling 100 and the ARM64 exception 504 being handled using the frame-based exception handling, including the transition therebetween is merely for illustration. The transitions may not result in a change in the type of exception handling method. For example, exception handling processing may be performed where a transition is between frames that are both handled using the frame-based exception handling 200 or exception handling processing may be performed where a transition is between frames that are both handled using the chain-based exception handling 100. Thus, various aspects may be implemented with respect to compiled hybrids between two architectures where both use the same handling techniques. In an example of the frame before and after the transition using the frame-based exception handling 200 (e.g., a virtual unwind, such as x86-64/ARM64), both transition handlers would have to retrieve and generate seeding CPU contexts (as illustrated at step 514), and both exception handling mechanisms on each side would use virtual unwinding in every step as illustrated on the right side of FIG. 5 (i.e., steps 516-526). There would be no exception chain involved. However, in an example of the frame before and after the transition using the chain-based exception handling 100, the transition handlers would not have to retrieve and generate seeding CPU contexts and would instead transition similar to the transition at step 522, and both exception handling mechanisms on each side would use chain-based unwinding as illustrated on the left side of FIG. 5 (i.e., steps 504-510).

In various aspects, the exception handlers receive two distinct types of input:

(1) Platform independent information about the exception; and (2) Information representing the state of the CPU at the time of the exception/fault. This parameter is CPU architecture dependent and always provided to the handler as an input, but the handler may send it back to the operating system as an output if the handler chooses to resume the execution with no unwind phase. Execution will be resumed using this same context. Because the context was passed though the handler by reference, the handler also has the option to modify the context being resumed. For example, the handler may choose to skip a bad instruction or fix the value of the dividend of an operation that was zero.

At the C (or higher) language level, code compiled as hybrid-host code was still compiled in the compiler's frontend, as emulated-guest code. For example, in x86/ARM64, the exception handler of a function that was compiled to hybrid-ARM64 still expects an x86 context as an input parameter. If it was any other case, existing code might not even compile, since the ARM64 context structure would contain different members. However, if the exception originated from hybrid-host code, this means that there is no accurate emulated-guest context set available. Furthermore, it is not possible to calculate one, since there is no strict mapping between the instructions in compilations to hybrid-host and emulated-guest from the same source code.

Various aspects attempt to achieve a compromise between code churn and compatibility. For example, when bootstrapping the exception dispatch phase for an exception originating from hybrid-host code, the mechanism of various aspects synthesizes an emulated guest context that is as approximate as possible, following the register mapping rules. This means that any handler which either does not observe the input parameter (e.g., expected architecture) at all or uses it for very simple and rough validations (e.g. "is the stack pointer in the expected stack segment?", or, "is the instruction pointer somewhere in the code of the expected function?"), then the code still functions correctly even though the code is being passed as an approximated context. If the handler attempts any modification of this synthetic emulated-guest context, then the mechanism performs a fail-fast to prevent erratic and unexpected consequence.

If the function is produced by hand-crafted hybrid-host assembly, then this means that the function was already (re)written for the purpose of compiled hybrid migration. When this is the case, various aspects provide a mechanism that must still enable the developer to provide a special exception handler that can receive and manipulate the true hybrid-host context of the exception/fault. This is possible because the mechanism will save both the synthetic/approximate emulated-guest context, as well as the true hybrid-host context. As described above, the first is passed as a parameter as "B", but an operating system helper function is provided to retrieve the location of the latter. Once the handler receives the true fault context, then all possible handling outcomes are allowed, including resuming the execution with an adjusted context.

Exemplary Operating Environment

Figure 6:
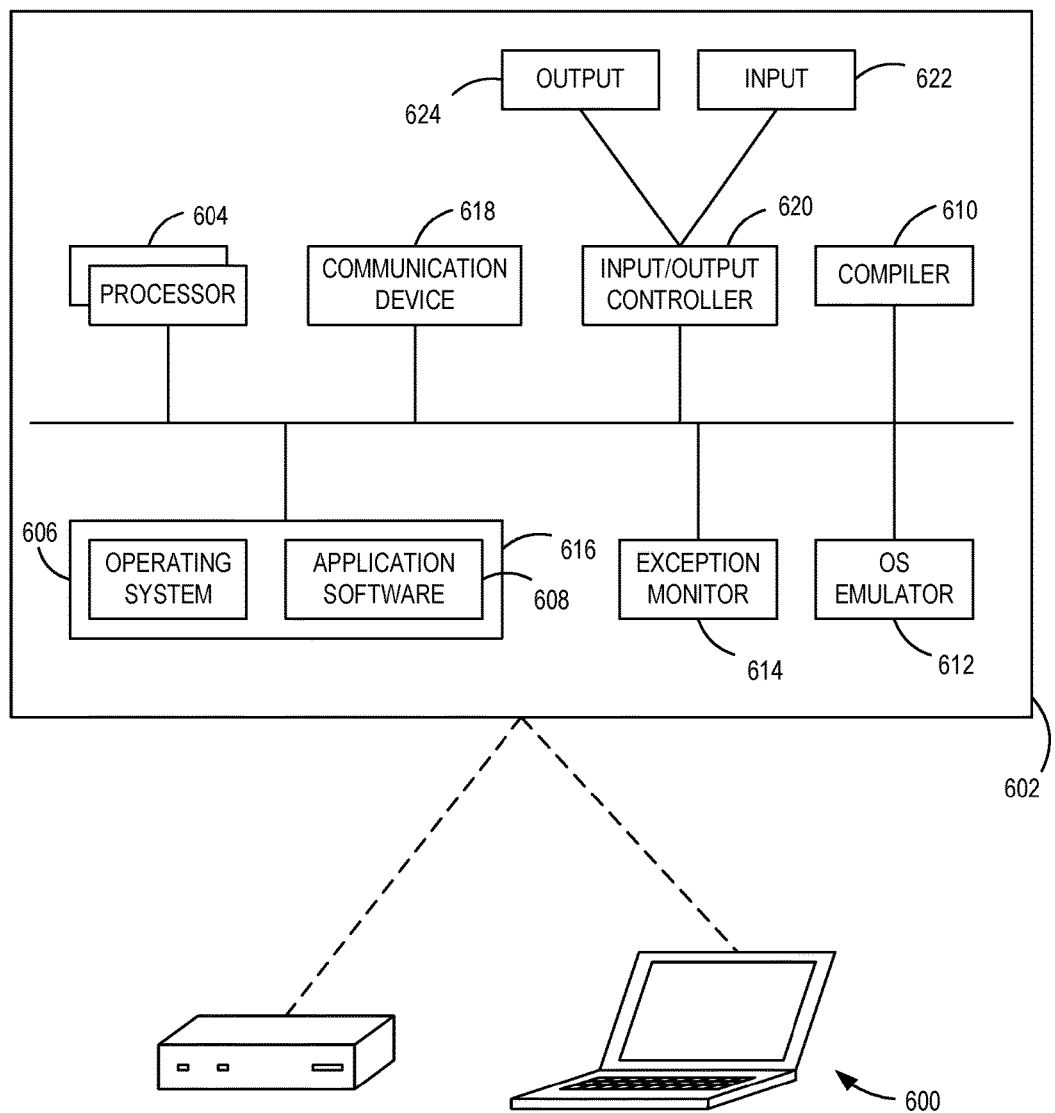
FIG. 6 illustrates a computing apparatus according to an embodiment as a functional block diagram.

The present disclosure is operable with a computing apparatus 602 according to an embodiment as a functional block diagram 600 in FIG. 6. In an embodiment, components of the computing apparatus 602 may be implemented as a part of an electronic device according to one or more embodiments described in this specification. The computing apparatus 602 comprises one or more processors 604 which may be microprocessors, controllers or any other suitable type of processors for processing computer executable instructions to control the operation of the electronic device. Platform software comprising an operating system 606 or any other suitable platform software may be provided on the apparatus 602 to enable application software 608 to be executed on the device. According to an embodiment, exception handling of hybrid binaries created by a compiler 610 and executed by an OS emulator 612, which is performed by an exception monitor 614 (as described herein) may be accomplished by software.

Computer executable instructions may be provided using any computer-readable media that are accessible by the computing apparatus 602. Computer-readable media may include, for example, computer storage media such as a memory 616 and communications media. Computer storage media, such as the memory 616, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 616) is shown within the computing apparatus 602, it will be appreciated by a person skilled in the art, that the storage may be distributed or located remotely and accessed via a network or other communication link (e.g. using a communication interface 618).

The computing apparatus 602 may comprise an input/output controller 620 configured to output information to one or more input devices 622 and output devices 624, for example a display or a speaker, which may be separate from or integral to the electronic device. The input/output controller 620 may also be configured to receive and process an input from the one or more input devices 622, for example, a keyboard, a microphone or a touchpad. In one embodiment, the output device 624 may also act as the input device (622). An example of such a device may be a touch sensitive display. The input/output controller 620 may also output data to devices other than the output device (624), e.g. a locally connected printing device. In some embodiments, a user may provide input to the input device(s) 622 and/or receive output from the output device(s) 624.

In some examples, the computing apparatus 602 detects voice input, user gestures or other user actions and provides a natural user interface (NUI). This user input may be used to author electronic ink, view content, select ink controls, play videos with electronic ink overlays and for other purposes. The input/output controller 620 outputs data to devices other than a display device in some examples, e.g. a locally connected printing device.

NUI technology enables a user to interact with the computing apparatus 602 in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

The functionality described herein can be performed, at least in part, by one or more hardware logic components. According to an embodiment, the computing apparatus 602 is configured by the program code when executed by the processor(s) 604 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

Figure 7:
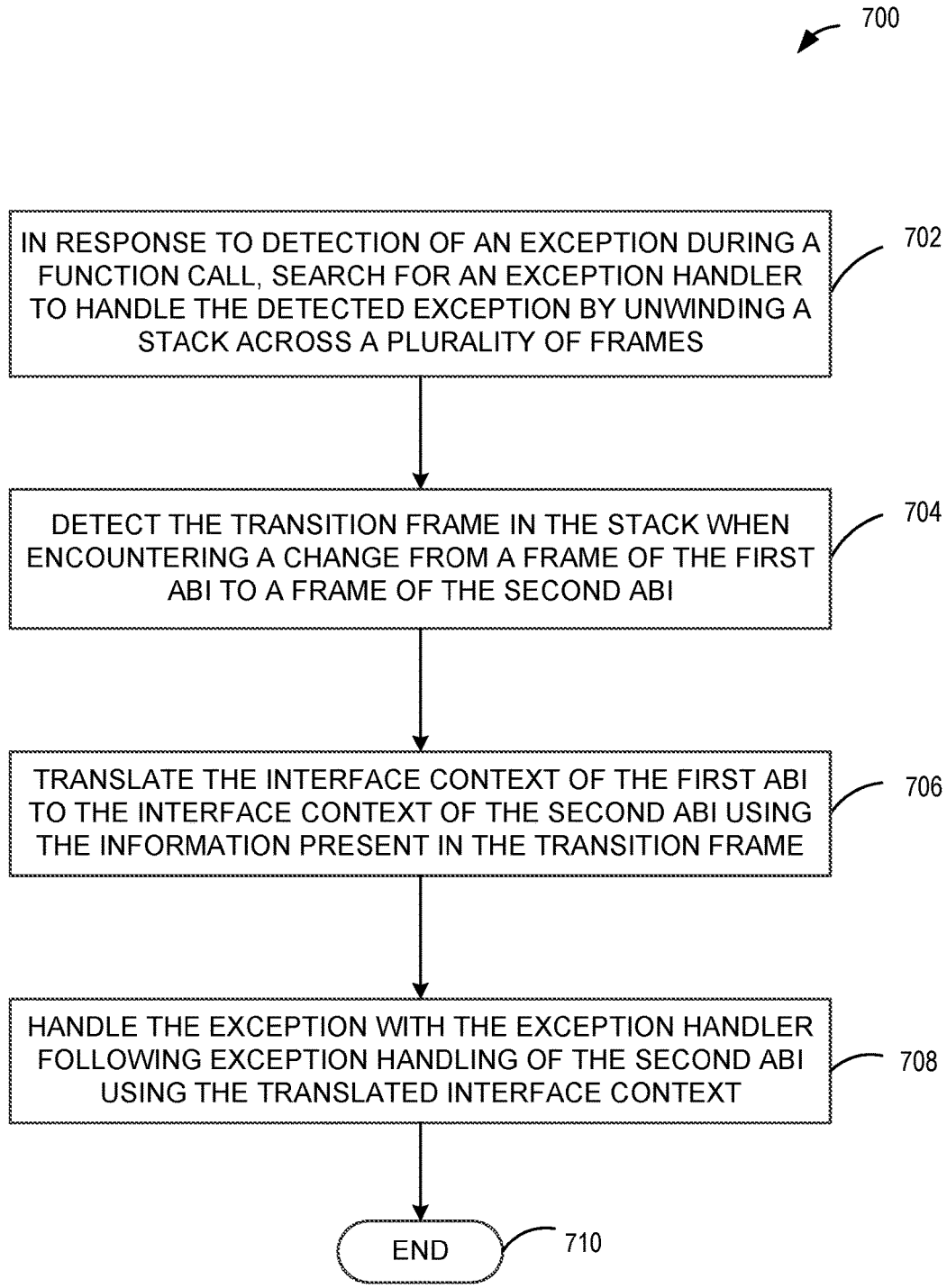
FIG. 7 is another exemplary flowchart illustrating operation of a computing device for exception handling according to an embodiment.

For example, FIG. 7 is an exemplary flow chart 700 illustrating operation of a computing device (e.g., the computing apparatus 602) to perform exception handling. The operations illustrated in the flow chart described herein may be performed in a different order than is shown, may include additional or fewer steps and may be modified as desired or needed. Additionally, one or more operations may be performed simultaneously, concurrently or sequentially.

At 702, the device searches for, in response to detection of an exception during a function call, an exception handler to handle the detected exception by unwinding a stack across a plurality of frames. In one aspect, the plurality of frames include a binary having functions associated with one of a first application binary interface (ABI) or a second ABI, which may be the same or different ABIs. The stack includes a transition frame created between frames of the first ABI and the second ABI during execution of the binary.

At 704, the device detects the transition frame in the stack when encountering a change from a frame of the first ABI to a frame of the second ABI. For example, the device determines that a transition frame between frames of different ABIs is present. Upon determining that the transition frame is present, the device, at 706, translates the interface context of the first ABI to the interface context of the second ABI using the information present in the transition frame. In one aspect, the exception handler follows exception handling of the second ABI, which may be different than the exception handling of the first ABI as described herein.

The device then, at 708, handles the exception with the exception handler following exception handling of the second ABI using the translated interface context. For example, the exception and handled such that normal operation may be resumed. The method 700 ends at 710.

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for exception handling, the system comprising: an exception dispatch mechanism configured to, in response to detection of an exception during a function call, search for an exception handler to handle the detected exception by unwinding a stack across a plurality of frames, the plurality of frames including frames created by functions of a binary, the functions being of a first application binary interface (ABI) and a second ABI, the first and second ABIs having different exception handling methods, the stack including a transition frame created between frames of the first ABI and the second ABI during execution of the binary;

a transition handler configured to detect the transition frame in the stack when encountering a change from a frame of the first ABI to a frame of the second ABI, the transition frame containing an exception handler that follows exception handling of the second ABI by translating an interface context of the first ABI to an interface context of the second ABI; and an execution handler configured to translate the interface context from the first ABI to the second ABI, the exception handler of the second ABI handling the exception using the translated interface context to allow the function call to be performed.

The system described above, wherein the first ABI is one of a chain-based exception handling method or a frame-based exception handling method, and the second ABI has the other one of the chain-based exception handling method or the frame-based exception handling method.

The system described above, wherein the first and second ABIs are chain-based exception handling methods.

The system described above, wherein the first and second ABIs are frame-based exception handling methods.

The system described above, wherein binary comprises an emulated binary being one of x86 or ARM64 and a hybrid binary being one of x86 or ARM64.

The system described above, further comprising an emulator configured to execute the binary, wherein during execution the stack including the plurality of frames is created, the transition handler configured to create the transition frame during execution.

The system described above, wherein the exception handler of the transition frame generate seeding context information when transitioning from frames of the first ABI to frames of the second ABI.

A computerized method for exception handling, the computerized method comprising:

searching for, in response to detection of an exception during a function call, an exception handler to handle the detected exception by unwinding a stack across a plurality of frames, the plurality of frames including a binary having functions associated with one of a first application binary interface (ABI) or a second ABI, the stack including a transition frame created between frames of the first ABI and the second ABI during execution of the binary;

detecting the transition frame in the stack when encountering a change from a frame of the first ABI to a frame of the second ABI;

translating an interface context of the first ABI to an interface context of the second ABI to unwind the frame of the second ABI using the translated interface context, the exception handler following exception handling of the second ABI; and handling the exception with the exception handler following exception handling of the second ABI using the translated interface context.

The computerized method described above, wherein the plurality of frames include functions created by functions created by both an emulated binary and a hybrid binary.

The computerized method described above, wherein the first and second ABIs have different exception handling methods.

The computerized method described above, wherein the first ABI is one of a chain-based exception handling method or a frame-based exception handling method, and the second ABI has the other one of the chain-based exception handling method or the frame-based exception handling method.

The computerized method described above, wherein the first and second ABIs are chain-based exception handling methods.

The computerized method described above, wherein the first and second ABIs are frame-based exception handling methods.

The computerized method described above, wherein the binary comprises an emulated binary being one of x86 or ARM64 and a hybrid binary being one of x86 or ARM64.

The computerized method described above, wherein during execution the stack including the plurality of frames is created, and creating the transition frame during execution.

The computerized method described above, further comprising generating seeding context information when transitioning from frames of the first ABI to frames of the second ABI.

One or more computer storage media having computer-executable instructions for exception handling that, upon execution by a processor, cause the processor to at least:

search for, in response to detection of an exception during a function call, an exception handler to handle the detected exception by unwinding a stack across a plurality of frames, the plurality of frames including frames created by functions associated with one of a first application binary interface (ABI) or a second ABI, the stack including a transition frame created between frames of the first ABI and the second ABI during execution of the binaries;

detect the transition frame in the stack when encountering a change from a frame of the first ABI to a frame of the second ABI;

translate an interface context of the first ABI to an interface context of the second ABI to unwind the frame of the second ABI using the translated interface context, the exception handler following exception handling of the second ABI; and handle the exception with the exception handler following exception handling of the second ABI using the translated interface context.

The one or more computer storage described above, wherein the plurality of frames includes frames created by functions of both an emulated binary and a hybrid binary, and the first and second ABIs have different exception handling methods.

The one or more computer storage described above, wherein the first ABI is one of a chain-based exception handling method or a frame-based exception handling method, and the second ABI is one of the chain-based exception handling method or the frame-based exception handling method, and the binary comprises an emulated binary being one of x86 or ARM64 and a hybrid binary being one of x86 or ARM64.

The one or more computer storage described above having further computer-executable instructions that, upon execution by a processor, cause the processor to at least execute the binary, wherein during execution the stack including the plurality of frames is created, and creating the transition frame during execution, and generate seeding context information when transitioning from frames of the first ABI to frames of the second ABI.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for exception handling. The illustrated one or more processors 1004 together with the computer program code stored in memory 1010 constitute exemplary processing means for exception handling.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for exception handling, the system comprising:
   an exception dispatch mechanism configured to, in response to detection of an exception during a function call, search for an exception handler to handle the detected exception by unwinding a stack across a plurality of frames, the plurality of frames including frames created by functions of a binary, the functions being of a first application binary interface (ABI) and a second ABI, the first and second ABIs having different exception handling methods, the stack including a transition frame created between frames of the first ABI and the second ABI during execution of the binary;
   a transition handler configured to detect the transition frame in the stack when encountering a change from a frame of the first ABI to a frame of the second ABI, the transition frame containing an exception handler that follows exception handling of the second ABI by translating an interface context of the first ABI to an interface context of the second ABI using information in the transition frame, wherein the information in the transition frame comprises exception handling relevant information for frames on each side of the transition frame; and
   an execution handler configured to translate the interface context from the first ABI to the second ABI, the exception handler of the second ABI handling the exception using the translated interface context to allow the function call to be performed, the translated interface context defining functionality to perform the function call on a host computing device operating as a native host machine.

2. The system of claim 1, wherein the first ABI is one of a chain-based exception handling method or a frame-based exception handling method, and the second ABI has the other one of the chain-based exception handling method or the frame-based exception handling method, the transition frame informs the exception handler that an ABI switch is taking place and retrieves information relevant to the exception handler taking over the exception handling, and wherein the transition frame links a stack unwinder of the first ABI with a stack unwinder of the second ABI.

3. The system of claim 1, wherein the binary comprises an emulated binary that is one of x86 or ARM64 and a hybrid binary that is one of x86 or ARM64, wherein the transition frame enables transition between an emulated execution and a pre-compiled execution, adapts parameter passing rules, maps host-guest registers, and saves registers to be preserved across a function call that are not mapped in the transition.

4. The system of claim 1, further comprising an emulator configured to execute the binary, wherein during execution the stack including the plurality of frames is created, the transition handler configured to create the transition frame during execution.

5. The system of claim 1, wherein the exception handler of the transition frame generates seeding context information when transitioning from frames of the first ABI to frames of the second ABI.

6. A computerized method for exception handling, the computerized method comprising:
   searching for, in response to detection of an exception during a function call, an exception handler to handle the detected exception by unwinding a stack across a plurality of frames, the plurality of frames including a binary having functions associated with one of a first application binary interface (ABI) or a second ABI, the stack including a transition frame created between frames of the first ABI and the second ABI during execution of the binary;
   detecting the transition frame in the stack when encountering a change from a frame of the first ABI to a frame of the second ABI;
   translating an interface context of the first ABI to an interface context of the second ABI using information in the transition frame to unwind the frame of the second ABI using the translated interface context, the translated interface context defining functionality to perform the function call on a host computing device operating as a native host machine, the exception handler following exception handling of the second ABI, wherein the information in the transition frame comprises exception handling relevant information for frames on each side of the transition frame; and
   handling the exception with the exception handler following exception handling of the second ABI using the translated interface context.

7. The computerized method of claim 6, wherein the plurality of frames includes frames created by functions of both an emulated binary and a hybrid binary.

8. The computerized method of claim 6, wherein the first and second ABIs have different exception handling methods.

9. The computerized method of claim 6, wherein the first ABI is one of a chain-based exception handling method or a frame-based exception handling method, and the second ABI has the other one of the chain-based exception handling method or the frame-based exception handling method.

10. The computerized method of claim 6, wherein the first and second ABIs are chain-based exception handling methods.

11. The computerized method of claim 6, wherein the first and second ABIs are frame-based exception handling methods.

12. The computerized method of claim 6, wherein the plurality of frames includes frames created by functions of both an emulated binary and a hybrid binary, the emulated binary being one of x86 or ARM64 and the hybrid binary being one of x86 or ARM64.

13. The computerized method of claim 6, further comprising (i) executing the binary, wherein during execution the stack including the plurality of frames is created, and (ii) creating the transition frame during execution.

14. The computerized method of claim 6, further comprising generating seeding context information when transitioning from frames of the first ABI to frames of the second ABI.

15. One or more computer storage media having computer-executable instructions for exception handling that, upon execution by a processor, cause the processor to at least:

search for, in response to detection of an exception during a function call, an exception handler to handle the detected exception by unwinding a stack across a plurality of frames, the plurality of frames including frames created by functions associated with one of a first application binary interface (ABI) or a second ABI, the stack including a transition frame created between frames of the first ABI and the second ABI during execution of the binaries;

detect the transition frame in the stack when encountering a change from a frame of the first ABI to a frame of the second ABI;

translate an interface context of the first ABI to an interface context of the second ABI using information in the transition frame to unwind the frame of the second ABI, the translated interface context defining functionality to perform the function call on a host computing device operating as a native host machine, the exception handler following exception handling of the second ABI, wherein the information in the transition frame comprises exception handling relevant information for frames on each side of the transition frame; and handle the exception with the exception handler following exception handling of the second ABI using the translated interface context.

16. The one or more computer storage media of claim 15, wherein the plurality of frames includes frames created by functions of both an emulated binary and a hybrid binary.

17. The one or more computer storage media of claim 15, wherein the first and second ABIs have different exception handling methods.

18. The one or more computer storage media of claim 15, wherein the first ABI is one of a chain-based exception handling method or a frame-based exception handling method, and the second ABI is one of the chain-based exception handling method or the frame-based exception handling method.

19. The one or more computer storage media of claim 15, wherein the binary comprises an emulated binary being one of x86 or ARM64 and a hybrid binary being one of x86 or ARM64.

20. The one or more computer storage media of claim 15, having further computer-executable instructions that, upon execution by a processor, cause the processor to at least (i) execute the binary, wherein during execution the stack including the plurality of frames is created, (ii) create the transition frame during execution, and (iii) generate seeding context information when transitioning from frames of the first ABI to frames of the second ABI.

* * * * *